March 10, 1959     B. B. STRANGE     2,876,689
APPARATUS FOR MAKING SEISMOGRAPH RECORD SECTIONS
Filed Aug. 13, 1957
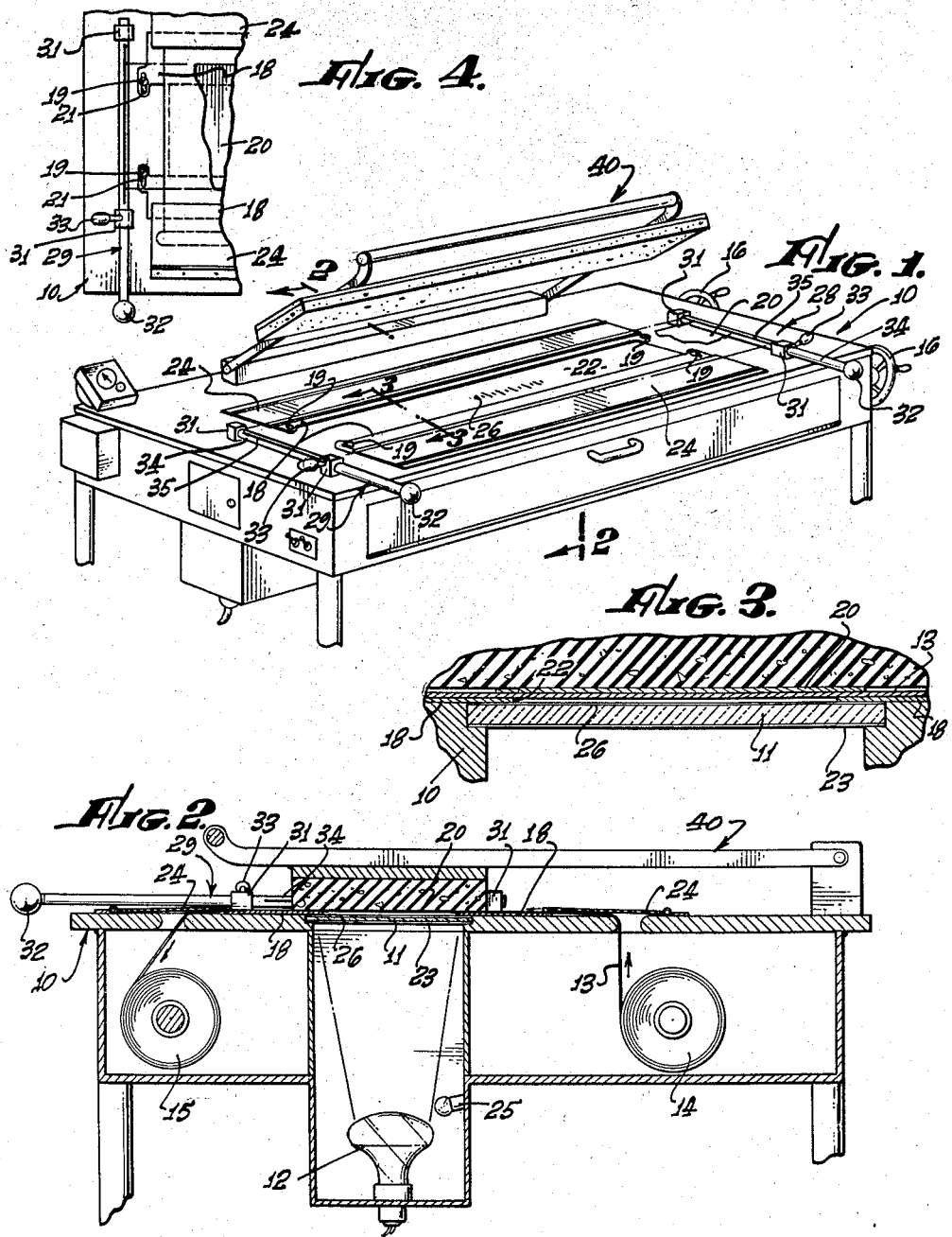
Booth B. Strange,
INVENTOR.
ATTORNEYS.

United States Patent Office 2,876,689
Patented Mar. 10, 1959

2,876,689

APPARATUS FOR MAKING SEISMOGRAPH RECORD SECTIONS

Booth Barrington Strange, Shreveport, La., assignor to Western Geophysical Company of America, Los Angeles, Calif., a corporation of Delaware Application August 13, 1957, Serial No. 677,983

3 Claims. (Cl. 95—73)

This invention relates to seismograph exploration and more particularly to an improved apparatus for making seismograph record sections.

In making seismographic surveys by the so-called reflection method, a record is made of the earth's disturbance produced at a given point by a detonation initiated near the earth's surface at another point. In general, the record shows waves which have traversed paths close to the earth's surface and waves which have penetrated the earth and have been reflected by interfaces between two layers of different properties or characteristics. In many cases several interfaces are present at varying depths and the record will show waves reflected from such interfaces. The amplitude of such reflected waves will vary over a considerable range depending upon the coefficient associated with each interface.

For example, in a common arrangement of seismographic exploratory and recording apparatus used for seismographic profiling work, a plurality of seismometer or detector groups are disposed in contact with the ground in a preferably straight line at opposed sides of the shot point. The detected tremors are commonly amplified and recorded on a time scale record together with the instant of shock initiation. The recorded information is then, most generally, corrected for various time scale differences which arise due to the geometery of the field arrangement, and transposed to form a visual seismograph record. The seismograph records are usually in the form of a film or paper strip showing a plurality of parallel record traces of the signals received at the various detectors. Thus, for example, if twenty-four detectors are used, a seismograph record is obtained with twenty-four parallel traces each of which shows an initial impulse followed by a series of reflections. From the traces an analysis is made to determine information about the underlying geological strata, particularly the depth and dip of interfaces. In order to utilize the information contained in the individual seismograph records a seismograph record section is formed to provide qualitative information and quantitative measurements of the traces obtained over an extended area of exploration. That is, the individual seismograph records, or seismograms, are in effect assembled to yield a larger area of interest and the assembled section is commonly termed a seismograph record section. For example, each record may represent a sub-surface distance of 1300 feet. The record section is then formed to represent a survey line measured in miles.

In the prior state of the art it is common to form a record section by recording the individual seismograph records on film, and then to assemble the films in side by side relation and print the assembled films. Also the individual records may be in the form of visual prints which are assembled in side by side relationship after which a photograph of the ensemble is made. By another method used in the art prior to the present invention such sections are commonly made by reproducing the traces either singly or by groups on photo-sensitive material and then shifting the material and reproducing the next trace or group of traces. However, such prior art methods involve difficulties due to the accuracy of correlation which is necessary in the assembly of a record section to produce optimum information. Thus, in reproducing individual records side by side to form a record section it is found that variations occur in the time scale of the various individual records due to such variables as camera speed, paper or film shrinkage, photo-processing and mechanical discrepancies which make it difficult if not impossible to match accurately the indices of the various traces to form an optimum record section.

Accordingly, it is an object of the present invention to provide an improved method and apparatus for assembling individual seismograph records to form a seismograph record section.

It is another object of the present invention to provide a method and apparatus for forming a seismograph record section having an increased time scale accuracy over record sections heretofore known to the art.

It is another object of the present invention to provide an improved method and apparatus for correlating the time scale occurrence of events shown in individual seismograph records.

The novel features which are believed to be characteristic of the invention, both as to its organization and method of operation, together with further objects and advantages thereof, will be better understood from the following description considered in connection with the accompanying drawing in which the invention is illustrated by way of example. It is to be expressly understood, however, that the drawing is for the purpose of illustration and description only, and is not intended as a definition of the limits of the invention.

The present invention is a method and apparatus for assembling a plurality of individual seismograph records comprising applying a tension force to each of the records to elongate the record to a time scale which is correlated with a predetermined time scale of the record section, and reproducing each of said records in side by side relationship.

Figure 1 is a view in perspective of the presently preferred embodiment of the apparatus of the present invention;

Figure 2 is a view taken along line 2—2 of Figure 1;

Figure 3 is an enlarged partial view taken along line 3—3 of Figure 1; and

Figure 4 is an enlarged partial view of the upper surface of the apparatus of Figure 1.

Referring now to the drawing, the presently preferred apparatus for forming a record section in accordance with this invention is shown. In the illustrative embodiment, for purposes of description an individual record which contains a plurality of traces, for example, twenty-four, is shown and described. A reproducing table 10 such as a photo-reflex table of the type well known to the art includes suitable support means for a transparent or translucent surface 11 with a suitable light source 12 positioned beneath the surface to furnish light thereto. A roll of reproducing material 13, such as auto-positive reflex paper is movably affixed to the table such that it can be moved over the upper surface of the table past the transparent surface 11. In the embodiment shown, the reproduction paper 13 is supported in an unexposed roll 14 at one side of the table and is moved by stages to an exposed roll 15 on the opposite side of the table by means of handwheels 16. A light mask 18 of opaque material is positioned above the transparent surface 11 to define the area of the record to be reproduced. The mask 18 comprises two sections, which are movably mounted upon the table by means of fasteners 19 extending through slotted openings 21 as shown in Figure 4, to define the width of the reproducing area. That is, the opening 22 defined by the mask is perpendicular to the direction of movement of the reproducing material 13 and is substantially equal in length and width to the length and width of an individual seismogram. Thus, in the illustrative embodiment the mask will be set equal in width to the width of a seismogram 20 having twenty-four traces. A filter 23 of the type well known to the art is positioned beneath the transparent surface 11 and hold down flaps 24 are affixed to the table surface to guide the reproducing paper 13. A pilot light 25 is positioned beneath the transparent surface 11 to furnish light which is of insufficient intensity to expose the reproducing material. A grid sheet 26 which is a plate of transparent material having grid lines thereon which will be produced upon the reproduced record is mounted upon the transparent surface 11 beneath the mask 18.

Means for mounting and tensioning the seismogram 20 are affixed to the table such that the seismogram is mounted in register with the opening 22, defined by the mask, and substantially in contact with the reproducing material 13, which is auto-positive-reflex paper in this embodiment.

Referring now particularly to Figures 1, 2 and 4 the clamp means of the presently preferred embodiment include a first clamp 28 positioned proximate one edge of the table 10 at an end of the transparent surface 11 and a second clamp 29 positioned proximate the opposite edge of the table and end of the surface 11. The clamps are of a type suitable for gripping opposite ends of the seismogram with sufficient frictional or other force to affix the ends of the seismogram and allow tensioning thereof. Thus, in this embodiment each of the clamps 28 and 29 comprises a rod 34 which is rotatably mounted in bearings 31 proximate the surface of the table 10. The clamps are manually rotatable by means of hand wheels or knobs 32 and can be fixed against rotation by means of set screws or clamps of any suitable type known to the art such as cam actuating levers 33 which will grip the rods 34 and prevent rotation. Thus, the clamps 28, 29 which grip the seismogram in this embodiment utilizes rod 34 which has a slot 35 therethrough of sufficient width to allow insertion of an end of the seismogram. By inserting an end of the seismogram into the slot of the respective clamps and rotating the rods, the ends will be securely fixed in the clamps 28 and 29. The rotatable clamps are positioned substantially parallel to the direction of movement of the auto-reflex paper 13 with the slots 35 positioned to receive the ends of the seismogram in register with the opening 22. Accordingly, after fixing the seismogram in the clamps 28 and 29, the clamps are rotated to apply a tension force which will elongate the seismogram. It may be seen that both clamps may be rotated in opposite directions or either may be rotated with the other fixed to orient the seimogram with respect to the opening.

Visual means of correlating the time scale of each record are provided, for example, by index marks on each record which may be visually correlated with similar index marks on each preceding or succeeding record. Or, as in the presently preferred embodiment, arbitrary indices or fiducial marks are provided on the grid 26 proximate a longitudinal edge of the opening which may be visually correlated with time scale indices or fiducial marks on each record.

Thus, in operation, in order to form a record section of a plurality of individual seismograph records or seismograms 20 which contain, for example, twenty-four traces, a seismogram 20 is fixed between the clamps 28 and 29 such that the twenty-four traces are in register with the opening 22 in the mask 18. The clamps 28 and 29 are then rotated to stretch the seismogram 20 until index marks on the record are visually aligned with index marks on the light grid 26. In order to visually correlate the marks the pilot light 25 is turned on and the various marks are visible through the reproducing material 13 and the seismogram. Thus, for example, index marks occurring at zero time, one second, two seconds, etc., are matched to similar time incremental index marks on the light grid by stretching the photo sensitive paper seismogram 20 until the marks coincide. The individual record is then reproduced on the auto-positive reflex paper by closing the upper hinged portion of the table 40 to bring the seismogram and reproducing material 13 firmly into contact and turning on the exposure light. The auto-positive reflex paper 13 used to produce the section is then moved beneath the opening 22 by the width of a record being reproduced by moving the paper 13 onto the roll 15 by means of the wheel 16. The next seismograph record 20 of the section is then mounted as before in the rotatable clamps 28 and 29 and elongated until the index marks are again aligned and then reproduced on the record section. Thus, each succeeding record is reproduced on the record section at the same time scale and time scale position to provide a record section of uniform accuracy.

If, in some instances the individual seismograph record is out of time scale by being too long, the record is heated or baked to cause it to shrink. It is then mounted as described above and elongated as before to correlate the index marks.

Thus, it has been found in accordance with the present invention that seismograph records can be stretched or elongated to correlate the time scale of individual records to a predetermined time scale of the record section being produced. Accordingly, the present invention provides a method and apparatus for assembling individual seismograph records such that each record in the record section is reproduced at a uniform time scale length and position.

What is claimed is:

1. Apparatus for forming a seismograph record section from a plurality of paper strip seismograph records comprising: a photo-reproducing table, a reproducing elongate area defined by said table, means positioned proximate one end of said area for fixing one end of said strip in register with said area, a movable clamp proximate the opposed end of said area for fixing a second end of said strip in register with said area, means for moving said movable clamp to elongate said strip with respect to said area whereby index marks on said record are moved to coincide with index marks on said table, means for reproducing said elongated record on said record section, and means for moving said record section with respect to said table.

2. Apparatus for forming a seismograph record section from a plurality of paper strip seismograph records comprising: a support having a photo-reproducing surface, a reproducing elongate area defined by said surface, means positioned proximate one end of said area for fixing one end of said strip in register with said area, a rotatable clamp proximate the opposed end of said area for fixing a second end of said strip in register with said area, means for rotating said rotatable clamp to elongate said strip with respect to said area whereby index marks on said record are moved to coincide with index marks on said surface, means for reproducing said elongated record on said record section, and means for relatively moving said record section and said surface.

3. Apparatus for forming a seismograph record section from a plurality of paper strip seismograph records comprising: a support having a photo-reproducing surface, a reproducing elongate area defined by said surface, means positioned proximate one end of said area for fixing one end of said strip in register with said area, a movable clamp proximate the opposed end of said area for fixing a second end of said strip in register with said area, means for moving said movable clamp to elongate said strip with respect to said area whereby index marks on said record are moved to coincide with index marks on said surface, means for reproducing said elongated record on said record section, and means for relatively moving said record section and said surface.

References Cited in the file of this patent

UNITED STATES PATENTS

| | | |
|---|---|---|
| 1,975,439 | Uher | Oct. 2, 1934 |
| 1,984,898 | Schambach | Dec. 18, 1934 |
| 2,190,188 | Landsiedel | Feb. 13, 1940 |
| 2,821,892 | Merten | Feb. 4, 1958 |